United States Patent
Boettiger et al.

(10) Patent No.: US 6,648,426 B1
(45) Date of Patent: Nov. 18, 2003

(54) PROCESS FOR CONTROLLING THE YAW RELATIONSHIP OF VEHICLES

(75) Inventors: Friedrich Boettiger, Esslingen (DE); Avshalom Suissa, Renningen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/273,759

(22) Filed: Mar. 22, 1999

(30) Foreign Application Priority Data

Mar. 20, 1998 (DE) .......................................... 198 12 238

(51) Int. Cl.$^7$ ................................................. B60T 8/60
(52) U.S. Cl. ...................................................... 303/146
(58) Field of Search ................................ 303/140, 146, 303/147, 155, 165, 177, 168

(56) References Cited

U.S. PATENT DOCUMENTS

| | | | | |
|---|---|---|---|---|
| 4,998,593 A | * | 3/1991 | Karnopp et al. ............. | 180/140 |
| 5,188,434 A | | 2/1993 | Ruf et al. | |
| 5,228,757 A | * | 7/1993 | Ito et al. ...................... | 300/100 |
| 5,428,532 A | * | 6/1995 | Yasuno ................... | 364/424.05 |
| 5,634,698 A | * | 6/1997 | Cao et al. .................... | 303/146 |
| 5,732,371 A | * | 3/1998 | Fujita ........................... | 701/38 |

FOREIGN PATENT DOCUMENTS

| | | |
|---|---|---|
| DE | 35 18 221 A1 | 11/1985 |
| DE | 37 31 756 A1 | 3/1989 |
| DE | 40 10 332 A1 | 3/1990 |
| DE | 40 18 495 A1 | 12/1991 |
| DE | 40 26 626 A1 | 2/1992 |
| DE | 42 26 746 C1 | 1/1993 |
| JP | 6-127355 | 5/1994 |
| WO | WO 89/11409 | 11/1989 |
| WO | WO 90/09301 | 8/1990 |

OTHER PUBLICATIONS

"FDR—Die Fahrdynamik–regelung von Bosch" ATZ Automobiltechnische Zeitschrift 96 (1994) 11, pp. 674–689.
Copy of EPO Office Action, together with English translation of relevant portion.
Copy of Japanese Office Action, together with English translation.
English Translation of Excerpts from DE 40 10 332 A1.

* cited by examiner

Primary Examiner—Jack Lavinder
Assistant Examiner—Brook King
(74) Attorney, Agent, or Firm—Crowell & Moring LLP

(57) ABSTRACT

To control the yaw behavior of a vehicle, a setpoint for the yaw rate of the vehicle is determined from the steering angle specified by the driver and a vehicle speed that has been determined. An actual value of the yaw rate is also determined. A controlling deviation is then determined from the difference between the actual value and the setpoint of the yaw rate, and is then supplied to controllers operating independently of one another. In one controller, the steering controller, the setpoint is determined for the wheel steering angle of the steered wheels, while in the other controller, the braking controller, a setpoint is determined for the change in the braking pressure of the brake wheels. Taking this value into account, a specified braking pressure is then determined. By means of the braking pressure control elements, the corresponding specified braking pressure is produced in the wheel brake cylinders and the corresponding wheel steering angle is supplied to the steered wheels by steering control members.

23 Claims, 4 Drawing Sheets

PROCESS FOR CONTROLLING THE YAW RELATIONSHIP OF VEHICLES

BACKGROUND AND SUMMARY OF THE INVENTION

This application claims the priority of Germany patent document 198 12 238.1, filed Mar. 20, 1998, the disclosure of which is expressly incorporated by reference herein.

The invention relates to a method for controlling the yaw behavior of a vehicle.

A method of the generic type is described, for example, in the article "FDR—Die Fahrdynamikregelung von Bosch [FDR—Driving Dynamics Control by Bosch]" in ATZ Automobiltechnische Zeitschrift 96 (1994) 11, p. 674 et seq. According to this article, a setpoint for the yaw rate of a vehicle is determined in a driving dynamic controller from the vehicle speed and the steering angle, using a one-track model of the vehicle. In addition, an actual value for the yaw rate is determined by a sensor. The difference between the actual value and the setpoint for the yaw rate is determined and the controlling deviation is derived from that. From this, an intervention in the wheel brakes is derived, which stabilizes the vehicle.

It is also known from German patent document DE 42 26 746 C1 to influence the driving behavior of a vehicle as a function of the yaw behavior by intervening in the steering.

The object of the methods according to the prior art is to improve the stability of the vehicle in critical driving situations by intervening in the steering or by a braking intervention. However, a simple intervention in the steering or the brake does not permit optimum utilization of the possible forces that can be transferred to the road, and therefore does not achieve an optimum stabilization of the vehicle in critical driving situations.

The object of the invention is therefore to make the vehicle as controllable as possible in critical driving situations and at the same time to extend as much as possible the range of critical driving situations that can be controlled.

These and other objects and advantages are achieved by the method according to the invention, which controls the yaw behavior of the vehicle by determining a setpoint for the yaw rate based on the steering angle specified by the driver, and determined vehicle speed. An actual value for the yaw rate is also determined, and a signal for controlling deviation is then derived from the difference between the actual value and the setpoint of the yaw rate. This controlling deviation is then supplied to two controllers operating independently of one another. In one controller (the steering controller), a setpoint is determined for the wheel steering angle of the steered wheels while in the other controller, the brake controller, a setpoint is determined for the change in braking pressure of the braked wheels. Taking this value into account, a specified braking pressure is then determined. The corresponding specified braking pressure is then developed by braking pressure adjusting members in the wheel brake cylinders and the corresponding wheel steering angle is produced by steering adjusting members at the steered wheels.

Therefore, one advantage of the invention is that redundancy is created by diversity as a result of the independence of the two controllers. In the event of failure of one of the two controllers, the other is always available for controlling the yaw behavior of the vehicle. No error recognition is required and the errors that develop are compensated automatically to the extent physically possible. In particular, "steering" is still possible using the brake if the steering controller fails.

Another advantage of the invention consists in the fact that the steerability of the vehicle is expanded to a wider range of vehicle states. It is equally advantageous that the controlling quality of the steering behavior is improved by the invention. The adaptation of the actual behavior to the specified behavior of the vehicle takes place more rapidly and with fewer controlling deviations.

Other objects, advantages and novel features of the present invention will become apparent from the following detailed description of the invention when considered in conjunction with the accompanying drawings.

DETAILED DESCRIPTION OF THE DRAWINGS

Figure 1:
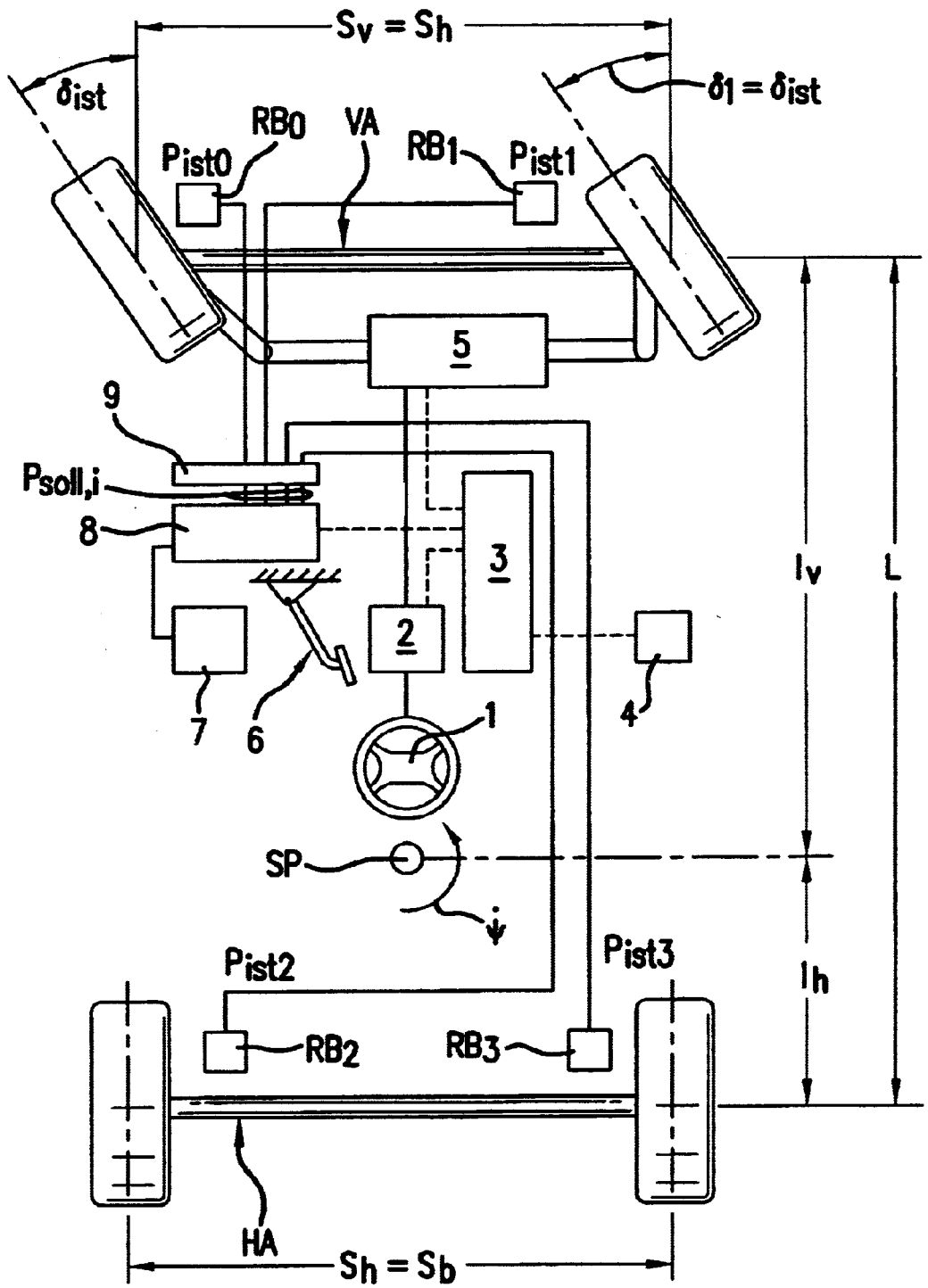
FIG. 1 is a schematic diagram of a vehicle with the positioning members.

In FIG. 1, a vehicle is shown schematically that is suitable for working the invention. It is a 2-axle vehicle that is steered by its front axle and has wheel brakes that can be controlled independently of one another on all four wheels (in other words, groups of braked wheels, with each of the groups consisting of one braked wheel). Groups of wheels whose braking pressure can be controlled jointly can be formed for example in commercial vehicles with trailing axles if the wheel brakes of wheels on the same side of the vehicle on the trailing axle and on the rear axle are supplied with the same braking pressure).

The vehicle has the yaw rate $\dot{\Psi}$ around the center of gravity SP. The distance between the steered front axle VA and the non-steered rear axle HA is represented by L; the distance between the center of gravity SP and front axle VA is represented by $L_v$, and the distance between the center of gravity and rear axle HA is designated $L_h$. The vehicle has a steering device 1 by means of which the driver can specify a steering angle δ. The steering angle δ is detected in a sensor 2, then supplied to control unit 3. The actual value $\dot{\Psi}_{ist}$ of the yaw rate is detected by sensor 4 and supplied to control unit 3. This unit develops a setpoint for the wheel steering angle $δ_{soll}$ which is set by steering control 5 at the two steered wheels of front axle VA.

The braking force applied by the driver at brake pedal 6 is converted in a braking force amplifier and main brake cylinder into a braking pressure $P_{fahrer}$ that is supplied to brake control device 8. In brake control device 8 a differential pressure $\Delta P_i$ can be applied to each of the wheel brake cylinders $RB_0, \ldots, RB_3$ regardless of the other wheel brake cylinders, so that a specific braking pressure $P_{soll,\ 0,\ \ldots,}$ $P_{soll,3}$ is produced. In order to be independent of the braking pressure generated by the driver, a braking pressure generating unit 9 is provided that makes it possible to generate a braking pressure $\Delta P_i$ in the wheel brake cylinders. The braking control device 8 is likewise controlled by control unit 3, with the setpoint $\Delta P_i$ for the change in braking pressure being determined in control unit 3.

For example, a vehicle model and the controlling equations obtained for it will be derived for the case of the vehicle described above, said equations making it possible to work the method according to the invention. The formula symbols provided at the end of the specification in the "formula symbols" list will be used. If the vehicle has other requirements (for example, if both axles of the vehicle can be steered or the braking pressures may not be changed independently of one another for all wheels), the controlling equations required under these conditions can be derived in a similar fashion.

When the vehicle is described in coordinates integral with the vehicle, the following motion equations are obtained for the lengthwise and transverse velocities as well as the yaw rate:

$$\dot{v}_x = \frac{1}{m}\{-(S_0 + S_1)\sin\delta + (U_2 + U_1)\cos\delta + U_2 + U_3\} + v_y \cdot \dot{\Psi} \quad (1)$$

$$\dot{v}_y = \frac{1}{m}\{S_0 + S_1\}\cos\delta + (U_0 + U_1)\sin\delta + S_2 + S_3\} - v_x \cdot \dot{\Psi} \quad (2)$$

$$\dot{\Psi} = \frac{1}{I_z}\{[S_0 - S_1)s_v + (U_0 + U_1)l_v]\sin\delta + [(S_0 + S_1)l_v - (U_0 - U_1)s_v]\cos\delta - (S_2 + S_3)l_h - (U_2 - U_3)s_h\} \quad (3)$$

These equations can be linearized by assuming that steering angle $\delta$ is small and therefore $\sin \delta \approx 0$ and $\cos \delta \approx 1$.

If the left and right lateral forces are combined axlewise and the difference between the circumferential forces between the wheels on the same side of the vehicle is formed, and it is also assumed that the wheelbase of the vehicle is the same for all axles, the differential equation for the yaw rate $\dot{\Psi}$ can be expressed as follows:

$$\dot{\Psi} = \frac{1}{I_z}([S_v \cdot l_v - S_h \cdot l_h] + \Delta U \cdot s_b). \quad (4)$$

This is the differential equation of a one-track model of the vehicle, as also described in detail in A. Zomotor, "Fahrwerktechnik, Fahrverhalten" [Chassis Technology, Driving Behavior], in: J. Reimpell (editor), 1st edition, especially pages 99 et seq.

To control the vehicle by means of the wheel steering angle, this equation is further simplified by the assumption that the circumferential force difference $\Delta u$ is neglected. The assumption that $\Delta u=0$ is then correct if the same circumferential force is transmitted on both sides of the vehicle and no individual brake controller intervenes in the line. The result of the equation is simplified by eliminating the lateral force behind $S_h$ by means of equation $S_h = m \cdot a_y - S_v$ and using the distance L between the axles. Finally the following expression is obtained:

$$\dot{\Psi} = \frac{1}{I_z}(S_v \cdot L - l_h m a_y)$$

for the differential equation of the yaw rate. For the yaw acceleration, however, it should be true that $\dot{\Psi} = \dot{\Psi}_{soll} - \lambda e,$ if e is used to represent the controlling deviation $e = \dot{\Psi} - \dot{\Psi}_{soll}$.

From the last two expressions for the yaw angle acceleration, the mathematical adjustment $S_{v,\ soll}$ can be isolated that is mathematical and depends on the steering angle. The following is obtained:

$$S_{v,soll} = \frac{l_h m a_y}{L} + \frac{I_z}{L}(\dot{\Psi}_{soll} - \lambda e). \quad (5)$$

The mathematical setting for the lateral force $S_{v,soll}$ must now be converted into the physical setting for the wheel steering angle $\delta_{soll}$. For this it is assumed that the lateral force at the front $S_v$ is located in the linear range of its dependence on the fire side slip angle at the front $\alpha_v$, and the influence of longitudinal slip $\lambda_U$ can be disregarded. With these assumptions, $S_v$ can be converted approximately into $\alpha v$ by a proportional relationship:

$$\alpha_{v,soll} = \frac{S_{v,soll}}{c_s} \quad (6)$$

The wheel steering angle $\delta_{soll}$ is calculated from the equation $$\alpha = \delta_{oll} + \beta - \frac{\dot{\Psi} \cdot l_h}{v_x} \quad (7)$$

This equation must now be solved for the wheel steering angle $\delta_{soll}$. The vehicle side-slip angle $\beta$ can be estimated in a known manner. (See, for example, German patent document DE 43 25 423 C2.) Further correction terms can be added in order to take into account the influence of the dynamic behavior of the wheel forces, the influences of the steering and the actuators, as well as the influences of errors and problems. The following expression is obtained:

$$\delta_{oll} = \alpha_{v,soll} + \frac{l_v \dot{\Psi}}{v_x} - \beta + \text{Correction terms} \quad (8)$$

The linearizations and assumptions made above are valid only for small side-slip angles $\alpha v$. A slip angle $\alpha u$ which is too large however is not desirable since it no longer increases the lateral force of the wheel on the ground. For this reason, the side-slip angle can be limited by first determining the side-slip angle that results from the calculated setpoint of the wheel steering angle $\delta_{soll}$. If this value exceeds a maximum $\alpha max$, a new setpoint $\delta_{soll}$ can be obtained which is determined in such fashion that the maximum $\alpha max$ is not exceeded. Alternatively, the deviation $\Delta\delta$ of the wheel steering angle $\delta_{soll}$ from the wheel steering angle $\delta_{soll}(\mu=1)$ which is necessary with an adhesion coefficient $\mu=1$ to reach the specified yaw rate $\dot{\Psi}_{soll}(\delta)$ that results from the steering angle δ specified by the driver, limited to a value between 5° and 10°. In addition, the rate of change $\delta_{soll}$ of the steering angle can also be limited to a maximum. The maximum is then specified by the properties of the steering controller. In order to make abrupt changes in the wheel steering angle, the values thus obtained are also filtered by a low-pass filter.

A yaw rate controller will now be described in which the four braking pressures that can be controlled independently of one another, namely $P_i$, i=0,1, ..., 3 are used as control values. Beginning with equation (3), a multivariable controller is used whose scaler controlled value is the yaw rate $\dot{\Psi}$ so that it is a so-called single input multiple output (SIMO) controller The circumferential forces to be produced by the brake on the wheel can be converted by the equation $$U_i = \frac{P_i K_{Pi}}{r_{eff}} \tag{9}$$

into specified braking pressures. Here, $K_{Pi}$ is an amplification factor that is inversely proportional to the effective area of the pressure on the wheel and $r_{eff}$ is the effective radius of the wheel. The lateral forces are coupled as a function of the side-slip angle αi and the longitudinal slip λ. The assumption is made that the lateral forces and hence the coupling between the lateral forces S and circumferential forces U as well are negligible, in other words $S_i=0$. Under this assumption and using equation (9), the following expression is obtained from equation (3):

$$\dot{\Psi} = (P_0 + P_1)\frac{l_v K_{P,v}}{r_{eff} I_z}\sin\delta + (P_0 - P_1)\frac{s_b K_{P,v}}{r_{eff} I_z}\cos\delta + (P_2 - P_3)\frac{s_b K_{Ph}}{r_{eff} I_z} \tag{10}$$

for the differential equation of the yaw rate. This equation is nonlinear in the steering angle δ. For this reason, it is linearized around a working point AP and $$\dot{\Psi} - \dot{\Psi}_{AP} = \frac{\partial \dot{\Psi}}{\partial \dot{\Psi}}(\dot{\Psi} - \dot{\Psi}_{AP}) + \sum_{i=0}^{3} \frac{\partial \dot{\Psi}_i}{\partial P_i}(P_i - P_{APi}),$$

from which the following linear equation in vectorial form is obtained:

$$\Delta\dot{\Psi} = 0\Delta\Psi + \begin{pmatrix} (l_v\sin\delta_{AP} + s_b\cos\delta_{AP})\frac{K_{pv}}{r_{eff}I_z}, & (l_v\sin\delta_{AP} - \\ s_b\cos\delta_{AP})\frac{K_{pv}}{r_{eff}I_z}, & \frac{s_b K_{ph}}{r_{eff}I_z}, & -\frac{s_b K_{ph}}{r_{eff}I_z} \end{pmatrix} \cdot \begin{pmatrix} \Delta P_0 \\ \Delta P_1 \\ \Delta P_2 \\ \Delta P_3 \end{pmatrix}$$

with $$\Delta\Psi = \Psi - \Psi_{AP}$$

$$\Delta\dot{\Psi} = \dot{\Psi} - \dot{\Psi}_{AP}$$

$$\Delta P_i = P_i - P_{APi}$$

This equation is suitable for multivariable controller designs. multivariable controllers are generally known and there are a number of possible designs for obtaining the control equations. The values $\dot{\Psi}_{AP}$, $\Psi_{AP}$ that describe the working point are replaced here by setpoints $\dot{\Psi}_{soll}$ and $\Psi_{soll}$. Within the framework of this sample description of a controller, reference will be made to a so-called LQR design (linear-quadratic regulator). For this purpose, a quadratic performance indep of the form $$I(\vec{x}, \vec{u}) = \int_0^\infty \{\vec{x}^T(t)Q\vec{x}(t) + \vec{u}^T R\vec{u}(t)\}dt$$

is minimized. Q and R are symmetrical, positively semidefinite or positively definite weighting matrices, respectively. The and control gain can be obtained by solving an algebraic Riccati equation. Since in this case only the yaw rate $\dot{\Psi}$ is controlled, the Riccati equation is scalar. If these calculations are performed, the feedback law is obtained:

$$\Delta P_i = -K_{LQR}(AP)\Delta\dot{\Psi}, \tag{11}$$

with the amplification $K_{LQR}$ (AP) depending on the working point and its expression under the assumptions made above being $$K_{LQR} = \sqrt{\frac{\frac{q}{r}}{\sum_{k=0}^{3} g_k}} g_i \tag{12}$$

where $$g_0 = \left(\frac{K_{P,v}l_v}{r}\right)\sin\delta - \left(\frac{K_{P,v}s_b}{r}\right)\cos\delta \tag{13}$$

$$g_1 = \left(\frac{K_{P,v}l_v}{r}\right)\sin\delta + \left(\frac{K_{P,v}s_b}{r}\right)\cos\delta$$

$$g_2 = -\frac{K_{P,h}s_b}{r}$$

$$g_3 = \frac{K_{P,h}s_b}{r}$$

and q/r is a constant. Constant q/r is obtained as follows: for the case in question of the SIMO regulator, the weighting matrix Q is reduced to scalar q. Owing to the robustness criteria, the weighting matrix was selected as a diagonal matrix. All of the diagonal matrix elements received the same weighting r, since the same intervention possibility is allowed for all wheels. The constant q/r is referred to hereinbelow as the amplification factor q/r.

To improve the dynamic properties, a D-member is then introduced into the P-controller This produces the following change in braking pressure:

$$\Delta P_i = -K_{LQR}(AP)(\Delta\dot{\Psi} + K_D\Delta\Psi) \tag{14}$$

The degrees of freedom in the controller design, in addition to the D-share $K_D$, are the values of weighting matrices Q and R, in other words the values q and r. Since these are only contained as a quotient in the amplification $K_{LQR}$, it is sufficient to vary one of the two values and to keep the other constant.

The speed of control of the wheel braking pressures also influences the steering control. The necessary steering interventions decrease inversely with the speed of the wheel brake control, since both controls operate in a supplementary fashion. However, it is important to note that as a rule, because of structural considerations, a hydraulic brake system has a greater inertia than a steering adjuster and that as a rule only a minor braking intervention should be made when steering.

Moreover, it should be kept in mind that the control value braking pressure $P_1$ still must be limited. Negative values and high positive values that are above the physically possible braking pressures do not make sense and are therefore set to zero or to the maximum braking pressure that can be reached. The change in pressure with time also cannot be arbitrarily large in physical terms. Hence, the absolute value of the derivative $\dot{P}_i$ is limited to a maximum value Pmax which results from the design factors of the braking system. In order to smooth out the pressure curves that have been made irregular by this limitation, a low-pass filter can be connected downstream from the limitation before the braking pressure values are delivered to the controlling section.

Figure 2:
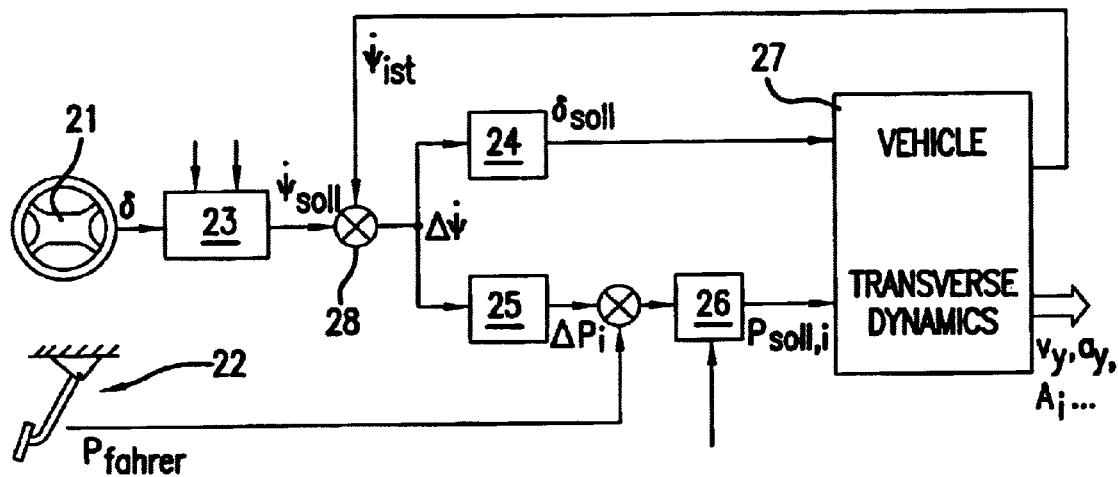
FIG. 2 is a block diagram of a method according to the invention.

FIG. 2 shows a block diagram of a method according to the invention. By means of the steering wheel 21, the driver specifies the steering angle δ. In the command filter 23, on the basis of the steering angle and the vehicle speed $v_x$ and using a suitable transfer function, a setpoint $\dot{\Psi}_{soll}$ is obtained for the yaw rate. The controlling deviation $\Delta\dot{\Psi}$ is obtained in comparator 28 from the setpoint $\dot{\Psi}_{soll}$ and the actual value $\dot{\Psi}_{ist}$, and is supplied to both the steering controller 24 and the braking controller 25. In the steering controller 24, at least one setpoint $\delta_{soll}$ is determined for the wheel steering angle. The driver specifies a braking pressure $P_{soll}$ by using brake pedal 22. The latter value is linked with the setpoints $\Delta P_i$ for the change in braking pressure as determined in the braking controller and supplied to ABS controller 26. In the ABS controller, the set braking pressure $P_{soll}$ is then determined which is to be produced at the braked wheels. The set braking pressure $P_{soll,i}$ is still limited to the point where a slip threshold value $g_{schlupf}$ specified for the wheels individually or groupwise or even axlewise, is not exceeded. The determined setpoint for the wheel steering angle $\delta_{soll}$ as well as the set braking pressure $P_{soll,i}$ are controlled by controllers in the vehicle. In the vehicle, the actual value $\dot{\Psi}_{soll}$ of the yaw rate is determined and supplied to the abovementioned comparator 28.

Figure 3:
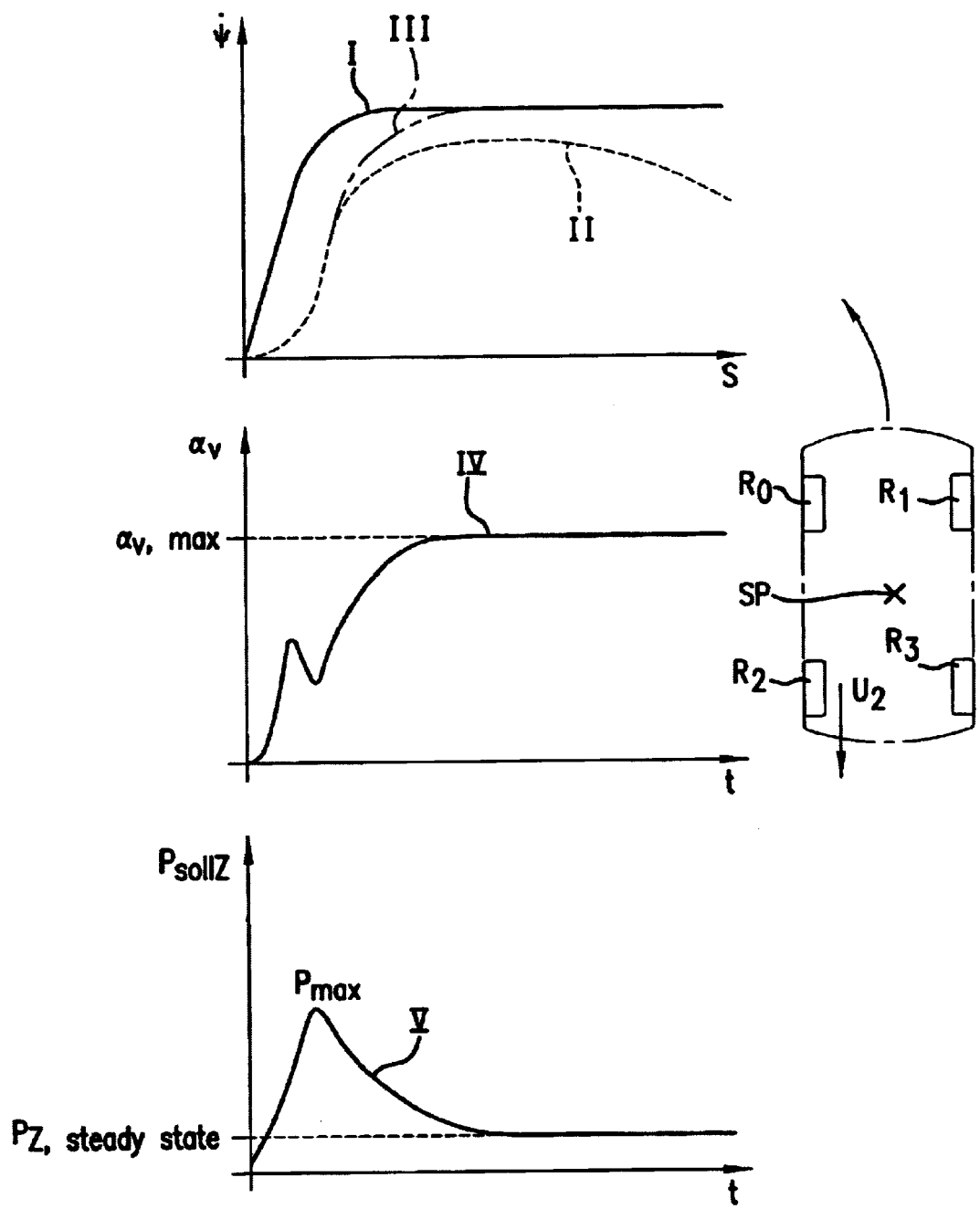
FIG. 3 shows the pattern of curves of different values that characterize controlling intervention.

For the case of steering into a left-hand curve, FIG. 3 shows the shape of various curves as a function of time t when the adhesion coefficient is low (ice, for example), and for this reason the setpoint of the yaw rate is not readied by steering alone. On the right side, the vehicle is shown schematically with the four wheels $R_0, \ldots, R_3$, with the shaded left rear wheel $R_2$ being braked during the controlling process, producing circumferential force $U_2$. In the middle of the vehicle, center of gravity SP is shown. In the uppermost of the three graphs, three curves I, II, and III are shown. Curve I drawn with a solid line represents the setpoint $\dot{\Psi}_{soll}$ for the yaw rate, as obtained from the steering angle δ specified by the driver. Curve II (shaded) represents the actual value $\dot{\Psi}_{ist}$ of the yaw angle rate if it is assumed that only one control of the steering takes place, which however, (because the adhesion coefficient is too low) is insufficient to allow the vehicle to exhibit the desired yaw behavior. Curve III (dot-dashed line) shows the curve when both the braking pressure and steering angle are controlled. In the case of an otherwise unbraked travel of the vehicle, the braking intervention takes place at the rear wheel on the inside of the curve (in this case therefore the rear left wheel $R_2$). In curve IV beneath, the path of the side-slip angle $\alpha_v$ at the wheels of the front axle is shown on the same time scale as for curves I to III.

Figure 4:
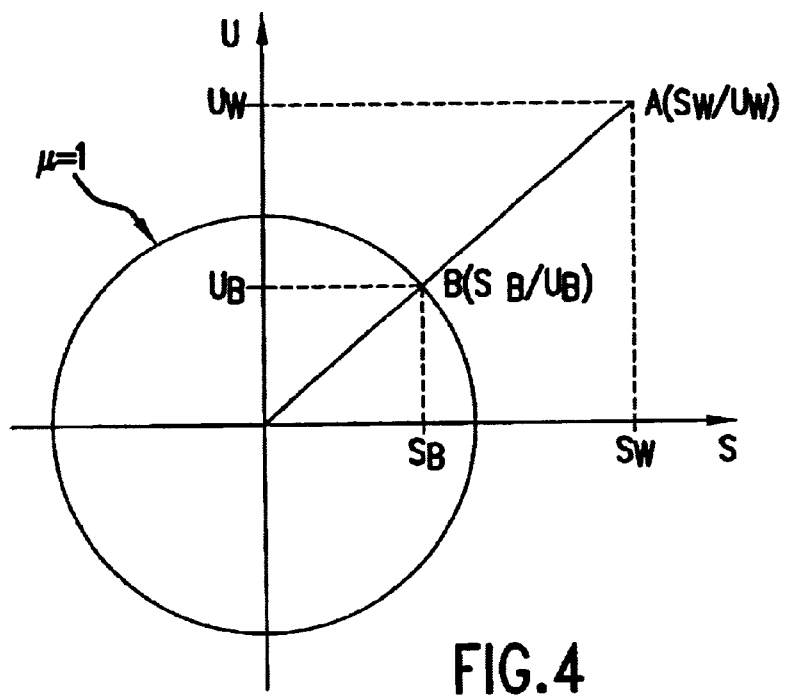
FIG. 4 shows a method for determining the amplification of the braking pressure controller as a function of the values set by the driver.

FIG. 4 shows a method that makes it possible to determine the ratio between the values r and q whose quotient is used in the amplification $K_{LQR}$ to calculate the change in braking pressure $\Delta P_i$. For this purpose, a desired lateral force $S_w$ is derived from the set yaw rate $\dot{\Psi}_{soll}$ determined from the steering angle δ set by the driver. A value for the circumferential force $U_w$ is derived from the braking pressure $P_{fahrer}$ produced by the driver. If the value desired by the driver lies outside the range of the physically possible, a physically possible value for the lateral force S and circumferential force U is determined by using the method of Kamin's circles, said value approximating the driver's wish. For this purpose, in a system of coordinates with the lateral force S and the circumferential force U as coordinate axes, the intersection B $(S_B|U_B)$ is determined that results when the source curve through the point A $(S_w|U_w)$ intersects the circle K that delimits a range of physically possible value pairs of S and U. The radius of circle K depends on the value of the adhesion coefficient μ, which can either be estimated from the wheel rpm values, for example by using known methods, or the unity circle can be used in standard fashion, assuming μ=1 for example. By means of the values S and U thus determined, or using the values $S_B$ and $U_B$ if they lie within the range of the physically possible, the value of the quotient q/r is derived from a family of curves. As a result, the amplification $K_{LQR}$ (AP) is also known. Basically, the family of curves has the property that the amplification factor q/r increases directly with lateral force S and falls with increasing circumferential force U. At the same time, a side-slip angle limit and a slip limit can be derived from corresponding curves for the lateral force and circumferential force that correspond to the driver's wish.

Figure 5:
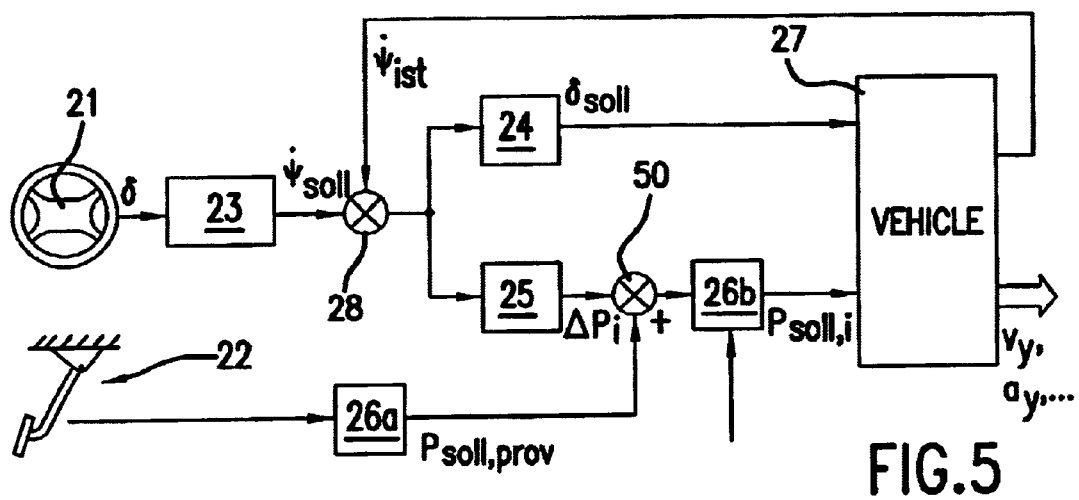
FIG. 5 is a block diagram of a second method according to the invention.

FIG. 5 shows the block diagram of a second method according to the invention. In this method, in contrast to the first method, the idea is to prevent the influence of the setpoint ΔP for changing braking pressure from being "lost" because of the limitation of the set braking pressure $P_{soll}$ by the ABS control. This takes place mainly because two ABS controllers 26, 26b are provided, where the specified slip threshold $g_{schlupf, B}$ for the second ABS controller is selected to be higher than the slip threshold values $g_{schlupf, A}$ for the first ABS controller, and with the setpoint ΔP for the change in braking pressure being added to the provisional specified braking pressures $P_{soll, prov}$ determined in the first braking controller. The values thus obtained are supplied to the second braking pressure controller. Otherwise, the block diagram of this FIG. 5 corresponds to the block diagram of FIG. 2.

Specifically, FIG. 5 shows the block diagram of the second method according to the invention. By means of the steering wheel, the driver specifies steering angle δ. In the command filter 23, on the basis of the steering angle and the vehicle speed $v_x$, using a vehicle model, a setpoint $\dot{\Psi}_{soll}$ for the yaw rate and a setpoint Ψ for the yaw acceleration are determined. In comparator 28, the controlling deviation $\Delta\dot{\Psi}$ is then determined using the actual value for the yaw rate $\dot{\Psi}_{ixt}$. The controlling deviation is then supplied to the steering controller 24 and to the braking controller 25. In the steering controller, at least one setpoint $\delta_{soll}$ is determined for the wheel steering angle. The driver specifies a braking pressure $P_{fahrer}$ by brake pedal 22. This value is supplied to the first ABS controller 26a in which the braking pressures specified by the driver are limited to provisional setpoints $P_{soll, prov, i}$ at which the wheel slip at the wheels does not exceed the specified first slip threshold value $g_{schlupf, A}$ in each case. These provisional setpoints $P_{soll, prov, i}$ are linked in adder 50 with setpoint $\Delta P_i$ and then supplied to the second ABS controller 26b. In the latter, the setpoints $P_{soll, i}$ for the braking pressure to be controlled at the wheels are determined so that the second slip threshold values $g_{schlupf, B}$ are not exceeded. The slip threshold values $g_{schlupf, A}$, $g_{schlupf, B}$ as a rule are specified axlewise; this means that a greater amount of wheel slip is allowed on one vehicle axle than on the others.

The setpoint determined for the wheel steering angle $\delta_{soll}$ as well as the set braking pressures $P_{soll, i}$ for the individual wheels or axles are controlled by control elements in vehicle 27. The actual value $\dot{\Psi}_{ist}$ of the yaw rate is determined in the vehicle and supplied to the abovementioned comparator 28. It is important to note in connection with the ABS controllers that the first ABS controller 26 is not disturbed permanently in its function by the second if both operate with a fed-back actual value $P_{ist}$ of the braking pressure in the wheel brake cylinders. This can be achieved for example by the disturbance being estimated in the second ABS controller and compensated or an ABS function is used at least in the first controller that does not depend upon the actual braking pressure PiSt in the wheel brake cylinders.

Figure 6:
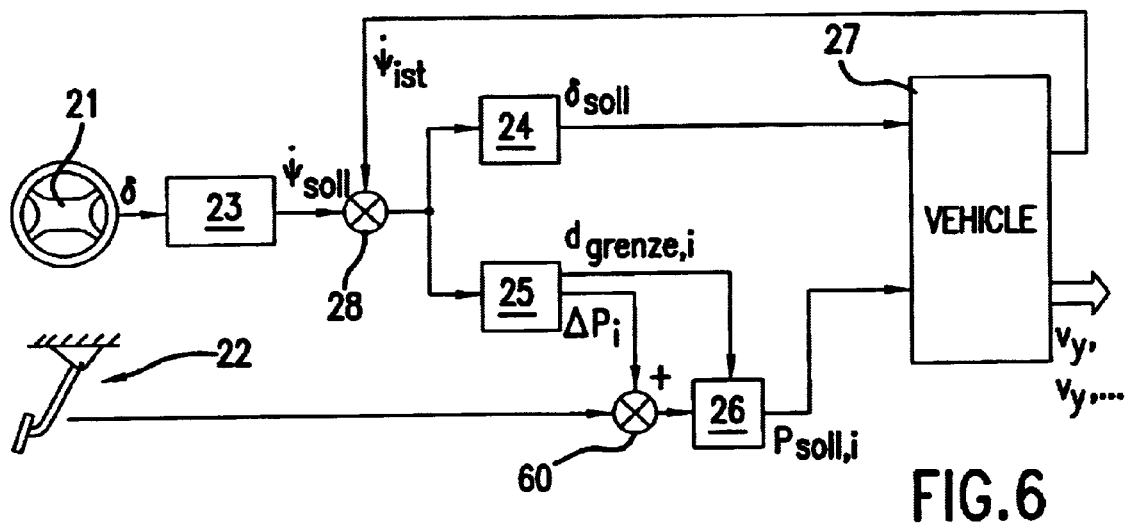
FIG. 6 is a block diagram of a third method according to the invention.

FIG. 6 shows a block diagram of a third method according to the invention. In this method, once again only one ABS controller is used, but the admissible wheel slip for the ABS control is determined wheelwise or axlewise as a function of the setpoint $\Delta P_i$ for the change in braking pressure.

The driver specifies the steering angle $\delta$ by means of steering wheel 21, and the angle is supplied to the setpoint transducer 23. In the latter, on the basis of the steering angle $\delta$ and the vehicle speed $v_x$ using a vehicle model, a setpoint $\dot{\Psi}_{soll}$ is determined for the yaw rate and a setpoint $\Psi_{soll}$ is determined for the yaw acceleration. In comparator 28, the controlling deviation $\Delta\dot{\Psi}$ is then determined from the setpoint $\dot{\Psi}_{soll}$ and the actual value $\dot{\Psi}_{ist}$ for the yaw rate.

Controlling, deviation $\Delta\dot{\Psi}$ is supplied to both steering controller 24 and braking controller 25. In steering controller 24, at least one setpoint $\delta_{soll}$ for the steering angle is determined. In braking controller 25, the (at least one) setpoint $\Delta P_i$ for the change in braking pressure in the wheel brakes is determined. The driver specifies a braking pressure $P_{fahrer}$ using brake pedal 22, and this pressure is linked in linker 60 with the (at least one) setpoint $\Delta P_i$ and then fed to ABS controller 26. From the braking controller 25, values for the slip threshold adjustment $d_{grenze, i}$ are also supplied to ABS controller 26, with these values being determined as a function of the setpoints $\Delta P_i$ for the change in braking pressure. A slip threshold adaptation $d_{grenze, i}$ can be determined for each wheel individually or jointly for the wheels on an axle. This depends on whether setpoint $\Delta P_i$ for the change in braking pressure is determined axlewise or wheelwise. A wheelwise or axlewise slip threshold adaptation is independent of whether slip threshold values $g_{schlupf, i}$ that are independent axlewise are specified axlewise or not.

Figure 6A:
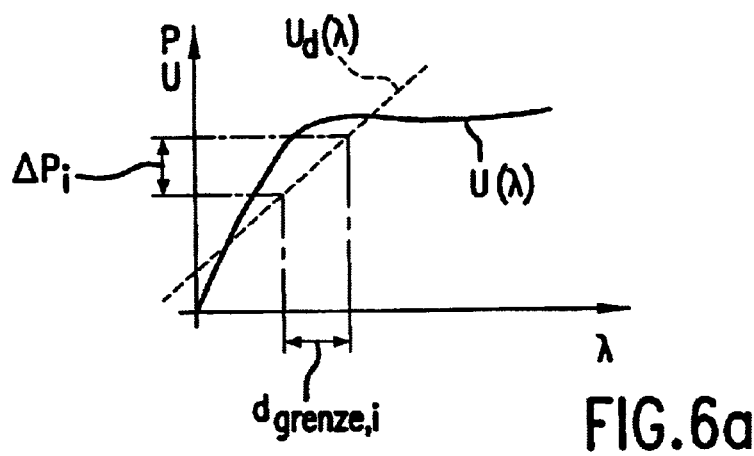
FIG. 6a is the assignment function between the threshold value adaptation and the setpoint of the change in braking pressure for an ABS controller

The slip threshold adaptation $d_{grenze, i}$ can be performed as follows:

For this purpose, a relationship is required between the setpoint $\Delta P_i$ of the change in braking pressure and the circumferential slip of the wheel $\lambda_U$. The fact that such a relationship exists can be taken from the assumption that the braking pressure $P_i$ in the wheel brakes is proportional to the circumferential force $U_i$. FIG. 6a shows the curve U ($\lambda$) of the slip $\lambda_U$. If curve ($\lambda$) is also known, every change in pressure $\Delta P_i$ can be associated with a change in slip $\Delta\lambda$ ($\Delta P_i$). This change in slip $\Delta\lambda$ ($\Delta P_i$) is then included as a change in the slip threshold adjustment $d_{grenze}$, i and therefore $d_{grenze, i} = \Delta\lambda (\Delta P_i)$. In the range of adhesion, a decrease in the braking pressure therefore corresponds to a considerable decrease in admissible wheel slip $g_{zul, i}$ since the slip threshold adaptation $d_{grenze, i}$ then has a negative sign.

However, in general the curve U ($\lambda$) is not known, since it depends upon many influential factors, for example the side-slip angle $\alpha_h$ of the rear axle and the unknown values of the vertical force $F_z$ and adhesion coefficient $\mu$. Therefore, to determine the adjustment in the slip threshold, a specific typical path of curve U ($\lambda$) is assumed as a relationship between circumferential force $U_i$ and slip $\lambda_U$. A further simplification is achieved by virtue of the fact that a linear relationship is assumed between circumferential force $U_i$ and slip $\lambda$, as shown in FIG. 6a as curve U($\lambda$) by dashed lines. As a result of this assumed linear relationship, the determination of the slip threshold adjustment $d_{grenze, i}$ can also be as follows: if the linear relationship has the slope $k_d$, then $$d_{grenze,i} = \frac{1}{k_d}\Delta P_i \tag{15}$$

is valid. From the graph it is evident that when the setpoint $\Delta P_i$ for the change in braking pressure is plotted as an interval on the ordinate, the distance between the abscissa values of the intersections of the interval boundaries with the assumed relationship between the circumferential force $U_i$ and slip ($\lambda_U$) (this is shown in FIG. 6a by dot-dashed lines for the curve $U_{d_i}(\lambda)$) the change in the slip threshold $d_{grenze, i}$ results.

In ABS controller 26 the wheel slip $g_{zul, i}$ admissible for each axle or each wheel is determined from the fact that at the specified slip limit $g_{schlupf, i}$, the slip threshold adjustment $d_{grenze, i}$ is added and so $$g_{zul,i} = g_{Schlupf,i} + d_{grenze,i}. \tag{16}$$

in order for the slip limit not to rise at will but only up to a specified maximum value $g_{zul, max}$, the admissible wheel slip $g_{zul, i}$ is limited at the upper end to a value that lies in the interval $$g_{zul,max} \in [g_{Schlupf,i}, 1.5\ g_{Schlupf,i}] \tag{17}$$

Then the respective effect braking pressures $P_{soll, i}$ are determined in the ABS controller from the braking pressure $P_{fahrer}$ supplied by the driver and the setpoints $\Delta P_i$ for the change in braking pressure in such fashion that the permissible slip $g_{gul, i}$ is not exceeded. These specified braking pressures $P_{soll, i}$ as well as the setpoint $\delta_{soll}$ for the wheel steering angle are then adjusted on the vehicle. The actual value $\dot{\Psi}_{ist}$ of the yaw rate is determined in vehicle 27 and supplied to comparator 28.

Symbols in Formulas

Subscripts i . . . Serial numbers from 0 to 3 or v, h
0, . . . , 3 . . . Numbering of the wheels of the vehicle
v . . . Front
h . . . Rear
b . . . Both, rear and front
ist . . . Actual value of a parameter
fahrer . . . Specified by the driver
soll . . . . Set point determined
x . . . Lengthwise axis of vehicle
y . . . Transverse axis of vehicle
z . . . Vertical axis
AP . . . Working point
LQR . . . Linear, quadratic regulator
w . . . . Desired value obtained from values specified by the driver of a value derived from it Preceding a Value D . . . Difference between two values of the following parameters:

Movement parameters $\dot{\Psi}$ . . . Yaw rate
$\ddot{\Psi}$ . . . Yaw acceleration
v . . . Speed, with subscript relative to an axis
$\dot{v}$ . . . Acceleration, with subscript relative to an axis Forces S . . . . Lateral force, with subscript, on one wheel
U . . . Circumferential force, with subscript, on one wheel Pressure $P_i$ . . . Braking pressure on wheel i
$P_{fahrer}$ . . . Braking pressure derived from a specification by the driver
. . . Change in braking pressure at wheel i
$P_{soll}$ . . . . Braking pressure to be produced with subscript, at wheel i Angle $\delta$ . . . Steering angle
$\delta_{soll}$ . . . Wheel steering angle to be produced
$\beta$ . . . vehicle sider slip angle
$\Psi$ . . . Yaw angle
$\alpha$ . . . five side-slip angle Dimensionless Parameters $\lambda_U$ . . . Circumferential slip Vehicle Parameters SP . . . Center of gravity
m . . . Mass of vehicle
s . . . Track width
I . . . Mass moment of inertia of vehicle around an axis
$c_s$ . . . lateral stiffness of tire
L . . . Distance between vehicle axles
$L_v$ . . . Distance between front axle and center of gravity
$L_h$ . . . Distance between rear axle and center of gravity
$K_p$ . . . Proportionality factor between circumferential force and braking pressure The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for controlling yaw behavior of a vehicle having steered wheels on at least one axle and having a plurality of braked wheels, said method comprising:
    determining a setpoint for a vehicle yaw rate, using a desired value for a steering angle of the vehicle, specified by a driver of the vehicle, and a determined value of the vehicle speed;
    determining an actual value of the vehicle yaw rate; and
    determining a controlling deviation from a difference between the actual value and the setpoint for the yaw rate; wherein
        the controlling deviation is supplied to a steering controller and to a braking controller, which steering controller and braking controller respond to the controlling deviation independently of each other, with at least one steering setpoint for a steering angle of the steered wheels being determined in the steering controller as a function of the controlling deviation, independently of the braking controller, and respective braking setpoints for change in braking pressure being determined in the braking controller as a function of the controlling deviation for respective ones of the braked wheels, independently of the steering controller;
    a specified braking pressure is determined for respective ones of the braked wheels as a function of the respective braking setpoints for the change in braking pressure;
    a braking pressure corresponding to the specified braking pressure is produced by braking pressure adjusting members in wheel brake cylinders of respective braked wheels;
    a wheel steering angle corresponding to said steering setpoint is produced by steering adjustment members at the steered wheels;
    the influence of the braking controller on the vehicle can be adjusted by an amplification factor that is variable in response to operation of the vehicle; and
    the amplification factor influences behavior of the braking controller, while the behavior of the steering controller remains unchanged.

2. Method according to claim 1 wherein said specified braking pressure for respective ones of the braked wheels is determined in such fashion that exceeding of at least one specified slip limit is prevented.

3. Method according to claim 1 wherein:
    the wheel brake cylinders are combined into groups;
    each group is composed of at least one wheel brake cylinder; and
    said specified braking pressure for respective ones of the braked wheels is determined for said braked wheels according to said groups.

4. Method according to claim 3 wherein a setpoint is obtained for each group of wheel brake cylinders for a change in braking pressure.

5. Method according to claim 1 wherein said at least one steering setpoint includes a steering setpoint determined for the wheels of each of said at least one axle having steered wheels.

6. Method according to claim 1 wherein when determining the setpoint for the wheel steering angles, it is assumed that circumferential forces transmitted to the road are the same on both sides of the vehicle.

7. Method according to claim 1 wherein in determining the setpoint for the change in braking pressure it is assumed that no lateral forces are transmitted to the road.

8. Method according to claim 1 wherein:
    a deviation of the setpoint for wheel steering angle of steered wheels that results from a desired steering angle entered by a driver of the vehicle is limited to a value between 5° and 10°.

9. Method according to claim 1 wherein a deviation of wheel steering angle from a wheel steering angle that is necessary in order, at an adhesion coefficient m=1, to reach the specified yaw rate which results from the steering angle specified by the driver, is limited to a value between 5° and 10°.

10. Method according to claim 1 wherein a setpoint of the wheel steering angle is limited to a value which is determined in such fashion that a side slip angle of the steered wheels does not exceed a limiting value.

11. Method according to claim 2 wherein the specified braking pressure is determined as follows:

initially braking pressure specified by the driver for each wheel is limited to a value that is determined so that wheel slip at this braking pressure would not exceed a first slip threshold value;

at least one setpoint for change in braking pressure is added to this threshold value; and a result obtained by such addition is limited to a value that is determined so that the wheel slip does not exceed a second slip threshold value that is greater than the first slip threshold value.

12. Method according to claim 11 wherein for each axle of the vehicle, respectively independent first and second slip threshold values are specified.

13. Method according to claim 2 wherein:

in the braking controller, in addition to at least one setpoint for the change in braking pressure, a slip threshold adjustment is also determined for the change in braking pressure, with an admissible wheel slip being determined from at least one specified slip limit and respective slip threshold adjustment; and the specified braking pressure is limited to a value such that the respective admissible wheel slip is not exceeded.

14. Method according to claim 13 wherein a slip threshold adjustment is determined for each specified slip limit.

15. Method according to claim 13 wherein a slip threshold adjustment is assigned to each setpoint for change in the braking pressure.

16. Method according to claim 15 wherein assignment of the slip threshold adjustment is based on a relationship between slip and braking pressure, with the amount of the slip threshold adjustment corresponding to a change in the slip which results when braking pressure is changed by the setpoint and when the sign of the slip threshold adjustment corresponds to a sign of the setpoint of the change in the braking pressure.

17. Method according to claim 16 wherein a straight positive rise is assumed as a relationship between slip and braking pressure.

18. Method according to claim 14 wherein an admissible slip is limited to a maximum value that is between 100% and 150% of a specified slip limit.

19. Method according to claim 1 wherein a slip limit is specified for each axle of the vehicle.

20. Method for controlling yaw behavior of a vehicle having steered wheels on at least one axle and having a plurality of braked wheels, said method comprising;

determining a setpoint for a vehicle yaw rate, using a desired value for a steering angle of the vehicle, specified by a driver of the vehicle, and a determined value of the vehicle speed;

determining an actual value of the vehicle yaw rate; and determining a controlling deviation from a difference between the actual value and the setpoint for the yaw rate; wherein the controlling deviation is supplied to a steering controller and to a braking controller, which steering controller and braking controller respond to the controlling deviation independently of each other, with at least one steering setpoint for a steering angle of the steered wheels being determined in the steering controller as a function of the controlling deviation, independently of the braking controller, and respective braking setpoints for change in braking pressure being determined in the braking controller as a function of the controlling deviation for respective ones of the braked wheels, independently of the steering controller;

a specified braking pressure is determined for respective ones of the braked wheels as a function of the respective braking setpoints for the change in braking pressure;

a braking pressure corresponding to the specified braking pressure is produced by braking pressure adjusting members in wheel brake cylinders of respective braked wheels;

a wheel steering angle corresponding to said steering setpoint is produced by steering adjustment members at the steered wheels; and the influence of the braking controller on the vehicle can be adjusted by a presettable amplification factor, while the behavior of the steering controller remains unchanged;

wherein the amplification factor is determined as a function of values specified by the driver.

21. Method according to claim 20, wherein values of steering angle and braking pressure are specified by the driver;

a desired lateral force is derived from the steering angle;

a desired circumferential force is derived from the braking pressure;

the amplification factor is determined so that as a desired lateral force rises, the amplification factor and hence the influence of the braking controller, both decrease; and as a desired circumferential force increases, the amplification factor, and hence the influence on the braking controller, increases.

22. A device for controlling yaw behavior of a vehicle having steered vehicle wheels and braked vehicle wheels, comprising:

a steering input device for a vehicle operator to input a desired value for a steering angle of the vehicle;

a braking input device operable by the vehicle operator to input a braking pressure;

a unit which generates a setpoint for a vehicle yaw rate based on said desired value for the steering angle of the vehicle;

a unit which provides a signal indicative of an actual value of the vehicle yaw rate;

a comparison unit which determines a controlling deviation from a difference between the actual value and the setpoint for the vehicle yaw rate;

a steering controller which determines at least one steering setpoint for a steering angle of the steered wheels, as a function of the controlling deviation, for causing a steering actuator to set a wheel steering angle corresponding to said steering setpoint; and a braking controller which determines respective braking setpoints for change in braking pressure for respective ones of the braked wheels, as a function of the controlling deviation, for causing braking actuators to adjust braking pressure for the respective braked wheels as a function of said braking setpoint and of said braking pressure input by the vehicle operator; wherein, said steering controller and said braking controller respond to said controlling deviation independently of each other to generate respective steering and braking setpoints, with at least one steering setpoint for a steering angle of the steered wheels being determined in the steering controller as a function of the controlling deviation, independently of the braking controller, and respective braking setpoints for change in braking pressure being determined in the braking controller as a function of the controlling deviation for respective ones of the braked wheels, independently of the steering controller, whether or not the vehicle operator has operated the braking input device, to provide vehicle yaw behavior control.

23. Method for controlling yaw behavior of a vehicle having steered wheels on at least one axle and having a plurality of braked wheels, said method comprising:

determining a setpoint for a vehicle yaw rate, using a desired value for a steering angle of the vehicle, specified by a driver of the vehicle, and a determined value of the vehicle speed;

determining an actual value of the vehicle yaw rate; and determining a controlling deviation from a difference between the actual value and the setpoint for the yaw rate; wherein the controlling deviation is supplied to a steering controller and to a braking controller, which steering controller and braking controller respond to the controlling deviation independently of each other, with at least one steering setpoint for a steering angle of the steered wheels being determined in the steering controller as a function of the controlling deviation, independently of the braking controller, and respective braking setpoints for change in braking pressure being determined in the braking controller as a function of the controlling deviation for respective ones of the braked wheels, independently of the steering controller;

a specified braking pressure is determined for respective ones of the braked wheels as a function of the respective braking setpoints for the change in braking pressure;

a braking pressure corresponding to the specified braking pressure is produced by braking pressure adjusting members in wheel brake cylinders of respective braked wheels;

a wheel steering angle corresponding to said steering setpoint is produced by steering adjustment members at the steered wheels; and the influence of the braking controller on the vehicle can be adjusted by a presettable amplification factor determined as a function of values specified by the driver.

* * * * *